United States Patent

Rosen et al.

[15] 3,675,732

[45] July 11, 1972

[54] MUFFLER FOR PNEUMATIC MOTOR

[72] Inventors: Samuel R. Rosen, Lorain; Alvin A. Rood, Westlake; Donald R. Scharf, Amherst, all of Ohio

[73] Assignee: Nordson Corporation, Amherst, Ohio

[22] Filed: May 17, 1971

[21] Appl. No.: 144,124

Related U.S. Application Data

[62] Division of Ser. No. 809,235, March 21, 1969.

[52] U.S. Cl. ............................. 181/36 A, 181/40, 181/65, 181/47 A, 181/57
[51] Int. Cl. ........................................ F01n 1/08, F01n 1/22
[58] Field of Search ............... 181/35 R, 36 R, 36 A, 40, 47, 181/47 A, 64 B, 64 R, 65, 57

[56] References Cited

UNITED STATES PATENTS

| | | |
|---|---|---|
| 3,318,412 | 5/1967 | Bailey ........................................ 181/65 |
| 3,339,668 | 9/1967 | Trainor .................................. 181/36 A |
| 3,385,395 | 5/1968 | Kurt et al. ............................. 181/36 A |
| 3,590,945 | 7/1971 | Murphy .................................... 181/65 |

FOREIGN PATENTS OR APPLICATIONS

| | | | |
|---|---|---|---|
| 932,373 | 7/1963 | Great Britain ......................... 181/36 A |

Primary Examiner—Robert S. Ward, Jr.
Attorney—Bosworth, Sessions, Herrstrom & Cain

[57] ABSTRACT

A hydraulic pump and double acting air motor therefor including means for controlling the inlet and exhaust of air to and from the opposite sides of the piston in the air cylinder. A pilot valve operated by the air piston controls one operating valve for the cylinder and a pilot relay valve. The pilot relay valve controls another operating valve which is in reverse phase with respect to the first operating valve. A muffler which inhibits ice formation is operatively associated with the operating valves for muffling the noise of the air being exhausted from the air cylinder through the operating valves with minimal accumulation of ice.

4 Claims, 6 Drawing Figures

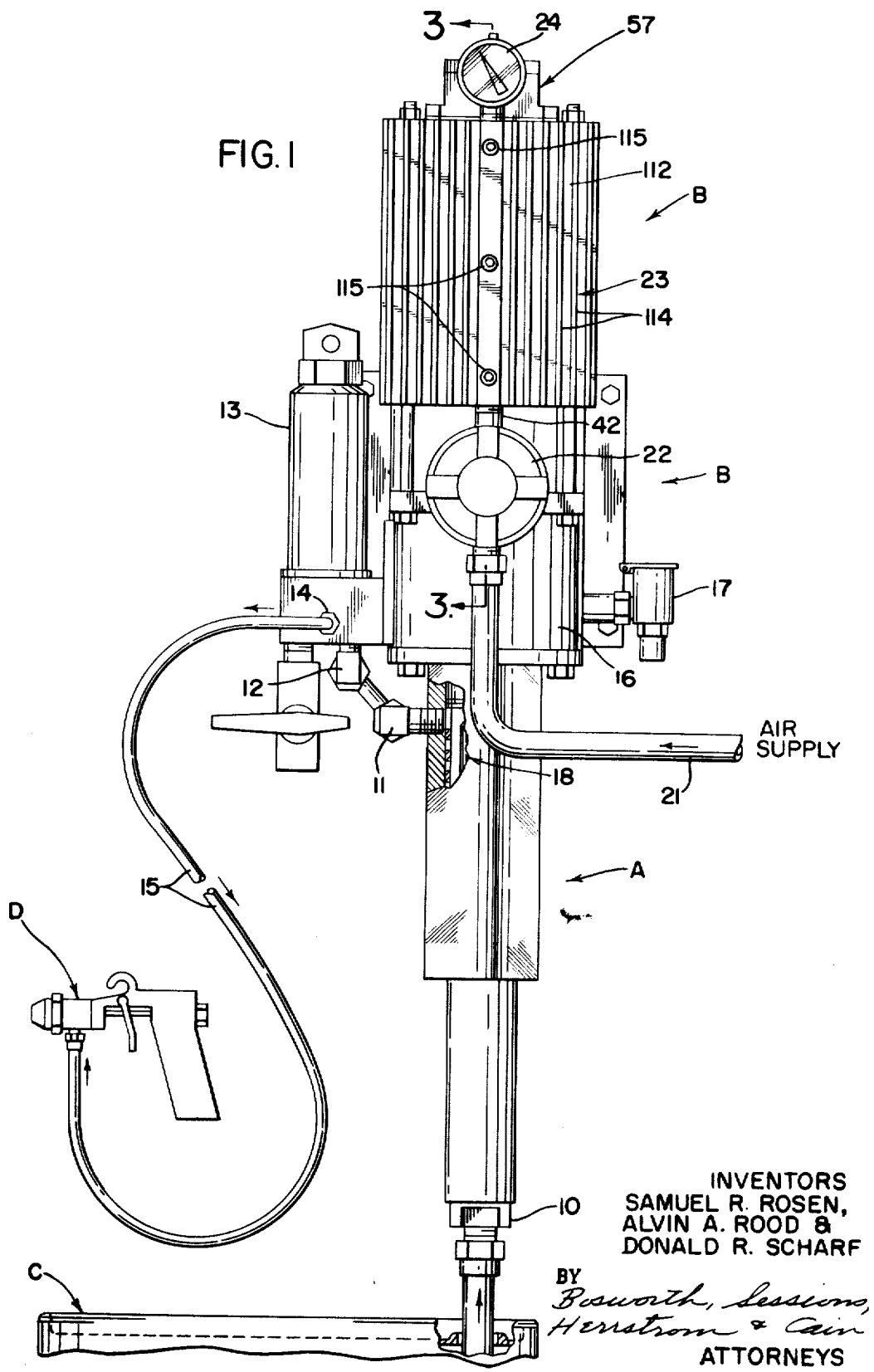

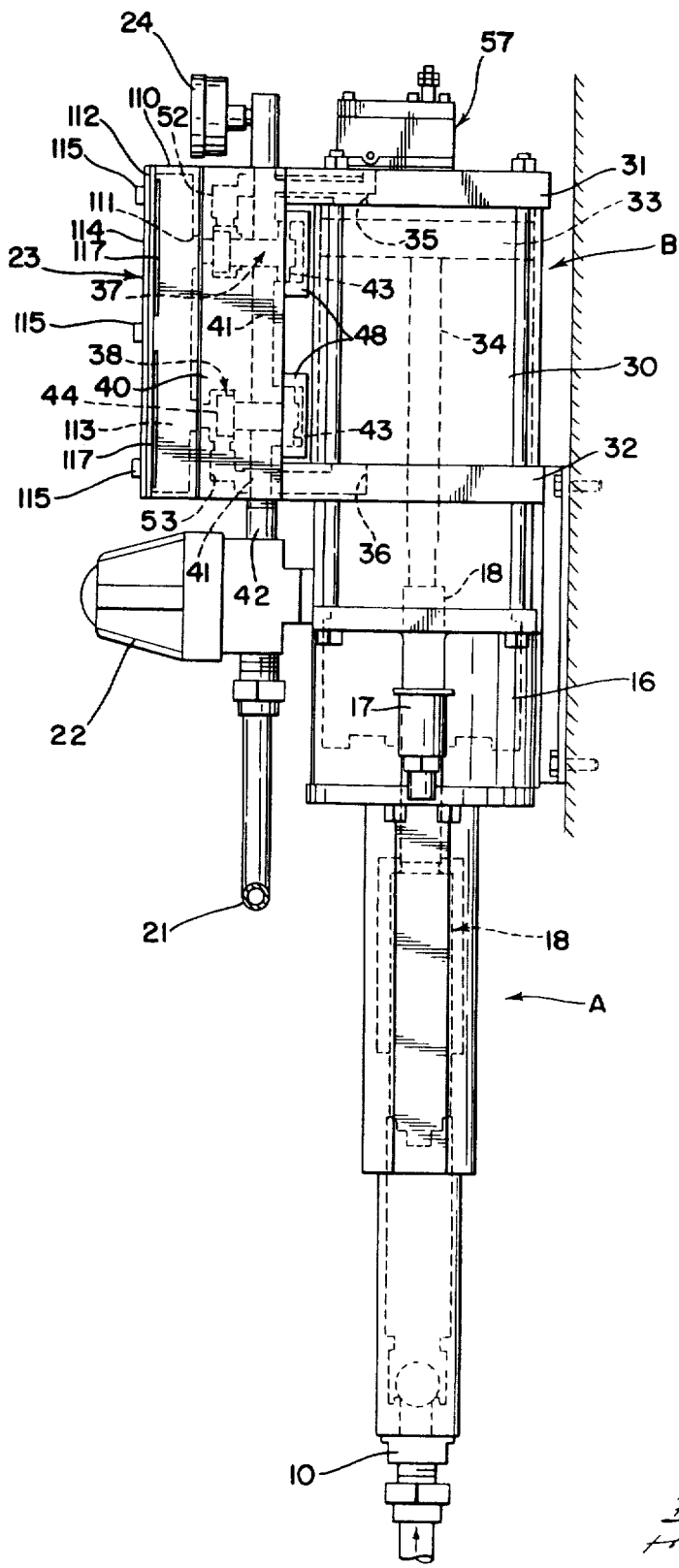

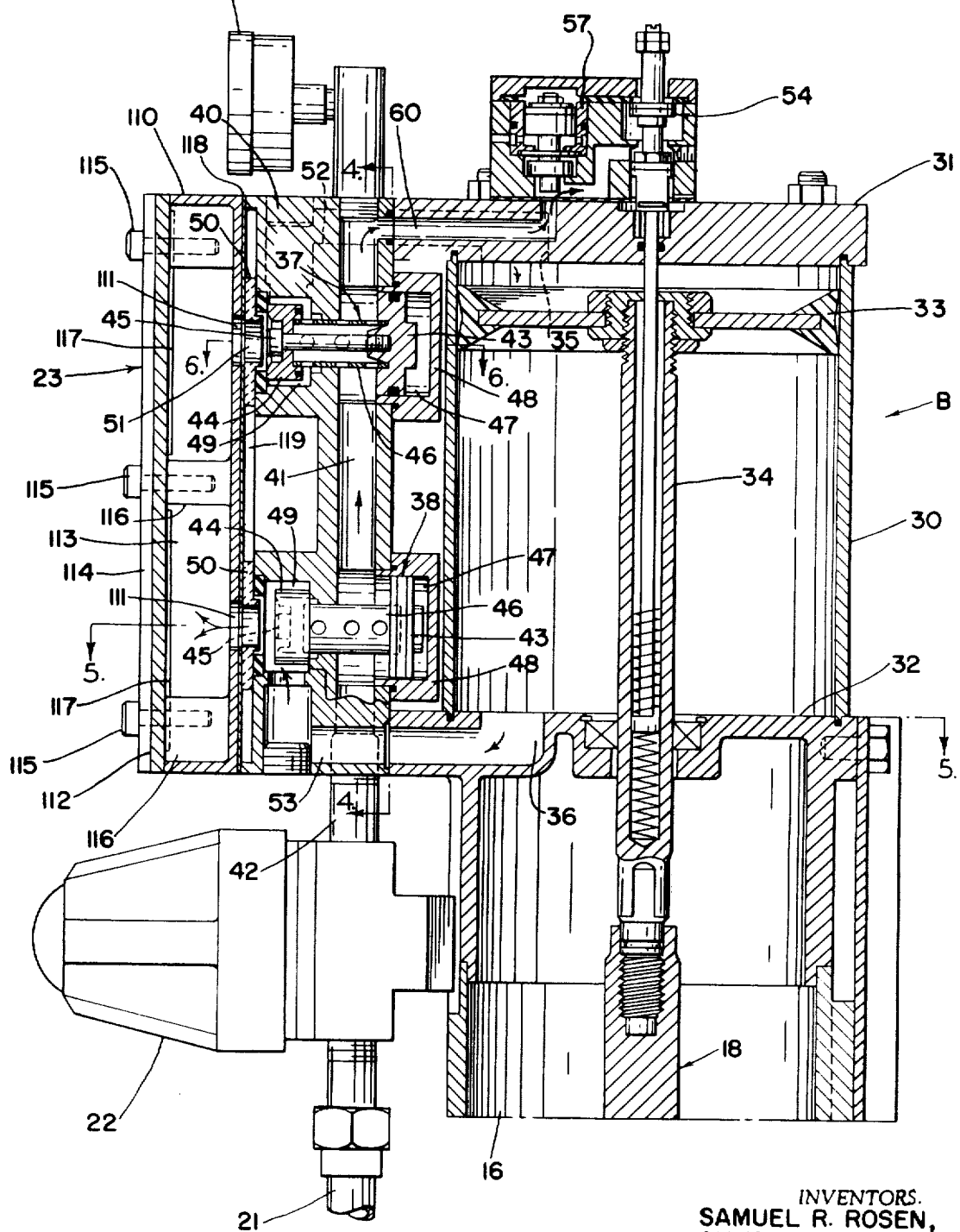

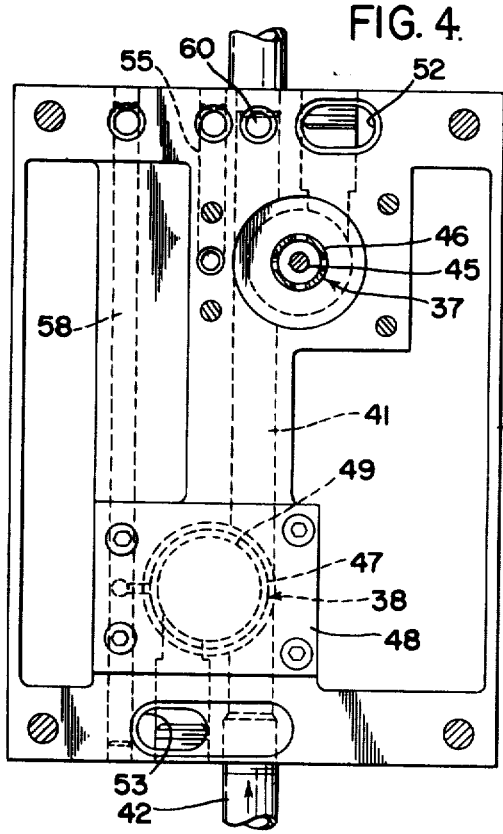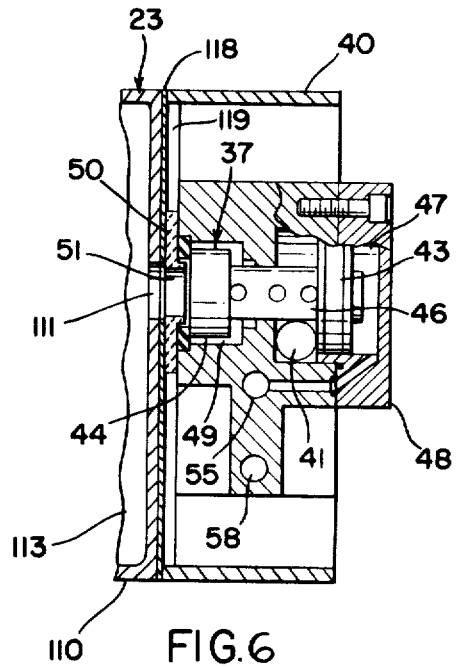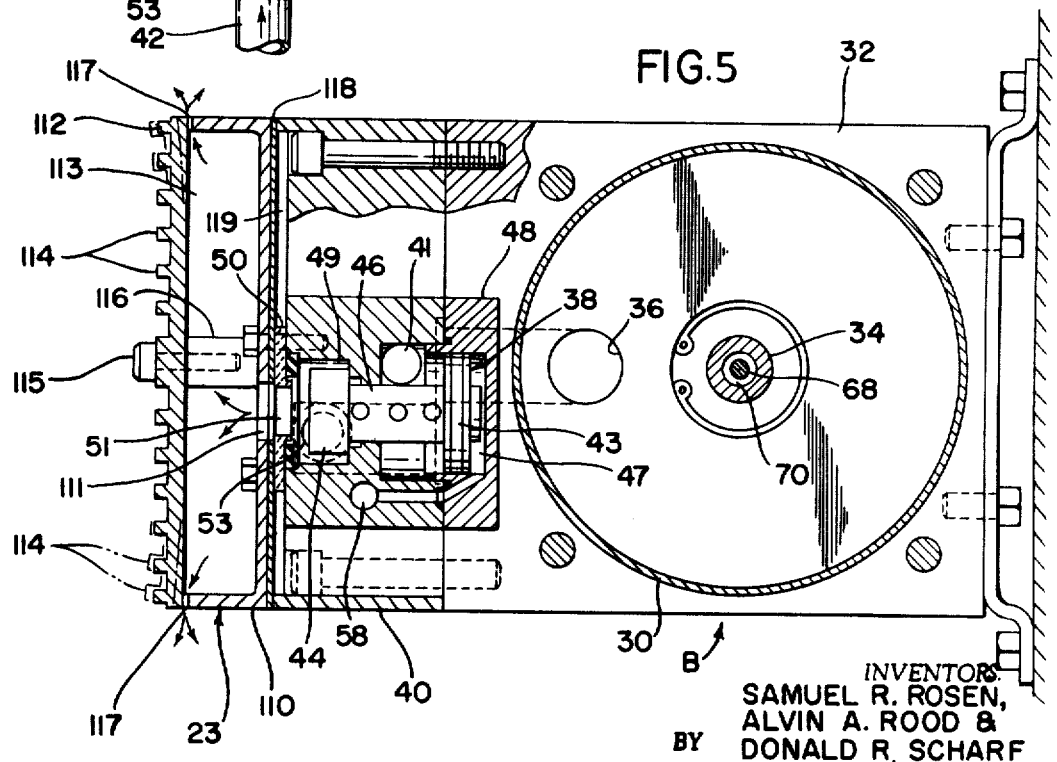

MUFFLER FOR PNEUMATIC MOTOR

CROSS REFERENCE TO RELATED APPLICATION

This application is a division of applicants' copending application, Ser. No. 809,235 filed Mar. 21, 1969.

BACKGROUND OF THE INVENTION

This invention relates to pneumatic motors and especially to systems for controlling air motors with reciprocating pistons used to drive associated equipment such as a pump piston. A particular aspect of the invention relates to a muffling device for muffling noise generated by the exhaust of fluid from such pneumatic motors.

The invention has particular utility in connection with single piston, double acting air motors used with double acting liquid pumps used to pump liquid paint to a spray gun.

A particular problem in the art to which our invention pertains is that of admitting air to and exhausting air from a pneumatic motor, particularly a double acting motor, with a minimum resistance to flow of air to and from the cylinder of the motor. A particular problem which has been solved by our invention is the inhibition of the formation of ice in and around the locations where air is exhausted from the cylinders and where the presence of water vapor in the air and abrupt drop in pressure at the exhaust ports encourages the formation of ice.

While the invention will be described in connection with air motors and particularly the problems deriving from the employment of moisture laden air, air is illustrative of all compressible fluids which may be employed in fluid motors controlled by our system advantageously.

As indicated above, the invention has particular utility in connection with the control of air motors for operating pumps for pumping paint or hot paint in the so-called hot airless method of spray painting. This method is disclosed and discussed in detail in U.S. Pat. Nos. 2,754,228 and 2,763,575 of James A. Bede. In this method the paint, whether hot or cold is projected from a small orifice nozzle under high pressure and the continuity of an even pressure is most desirable to obtain the best results.

Such air motors have in the past conventionally been operated by means of a four-way air valve such as that disclosed in U.S. Pat. No. 3,176,719. The four-way air valve disclosed therein provides an exhaust passage which is free from obstructions and which permits exhaust air to escape with a reduced tendency to form ice.

One problem associated with the prior art air motor control systems utilizing the four-way air valve is that of excessive noise generated by the exhaust of air. Also while the four-way air valve is effective to prevent formation of ice under most conditions, instances have occurred where under prolonged high speed operation ice does accumulate and adversely effect the operation of the air motor, particularly when the exhaust air is passed through a muffler, ice then tending to form in the muffler.

The device of the present invention reduces the difficulties indicated above and affords other features and advantages heretofore not obtainable.

SUMMARY OF THE INVENTION

It is among the objects of the invention to muffle the noise deriving from the exhaust of air from a double acting air motor.

Another object is to prevent the formation of ice in a manner harmful to normal operation, during exhaust of air from a double acting air motor.

A further object is to provide a muffling device for a pneumatic motor that will accomplish the foregoing objects and that is simple and rugged in construction and economical to make and maintain.

These and other objects and advantages are accomplished in a single cylinder double acting air motor that includes two operating valves for transmitting fluid alternately to opposite ends of the cylinder to drive a piston, and for exhausting fluid alternately in opposite phase from opposite ends of the cylinder. The operating valves are provided with a muffler for receiving fluid exhausted from the cylinder through the operating valves. The muffler comprises an open sided muffler box defining a chamber communicating with the exhaust ports of the operating valves. The open side is covered by a flat flexible closure plate secured to the body portion with marginal portions thereof spaced slightly outward from top edges of the side walls of the box to define narrow spaces. When fluid is exhausted through the muffler, the plate may flex outwardly from the box due to fluid pressure so that any ice which may tend to accumulate in the narrow spaces will increase the pressure and be blown out with additional flexing of the plate.

According to another aspect of the invention the muffler is thermally insulated from the operating valves by a thermal barrier means so that the valves will not lose heat to the muffler which is chilled due to the expansion of air as it exits the exhaust ports. With this arrangement the possibility that the valves may be chilled sufficiently to cause ice to form therein from moisture laden air is substantially reduced.

BRIEF DESCRIPTION OF THE DRAWINGS

FIG. 1 is a front elevation of a double acting liquid pump and associated single cylinder, double acting air motor including the muffling device of the invention;

FIG. 2 is a side elevation of the pump and air motor of FIG. 1;

FIG. 3 is a cross-sectional view of the air motor of FIGS. 1 and 2, drawn to an enlarged scale and taken on the line 2—3 of FIG. 1;

FIG. 4 is a sectional view taken on the line 4—4 of FIG. 3;

FIG. 5 is a cross-sectional view taken on the line 5—5 of FIG. 3;

FIG. 6 is a fragmentary cross-sectional view taken on the line 6—6 of FIG. 3.

DESCRIPTION OF THE PREFERRED EMBODIMENT

Referring more particularly to the drawings and initially to FIGS. 1 and 2 there is shown a paint spraying apparatus for use in spraying liquid paint according to the so-called airless method described above in the "Background of the Invention". The apparatus comprises a double acting hydraulic pump A, driven by a double acting air motor B, and adapted to pump paint from a paint pail C to a spray gun D.

Paint from the paint pail C which may be, for example, a standard size drum, enters the hydraulic pump A through an inlet fitting 10 located at the bottom thereof and exits through an outlet fitting 11. From the outlet fitting 11 the paint is directed to another fitting 12 on a paint filter 13 mounted on the pump A. The paint filter 13 serves to filter out solid particles within the paint that may be too large to pass through the nozzle of the spray gun D.

The paint from the filter 13 exits through an outlet fitting 14 to a flexible hose 15 which extends to the spray gun D. The hose 15 is preferably 25 feet or longer in order to provide some dampening effect in case of variable pressure output from the double acting pump A. The hose 15 being resilient and flexible, absorbs some energy at the peak pressure periods and thus gives a smoother more uniform pressure output to the spray gun D. The hydraulic pump A cycles at a rate typically about 40 cycles per minute and in a typical instance would have about a 4 cubic inch displacement.

Located at the upper end of the pump A is a solvent chamber 16 and an associated filler cup 17. The chamber 16 maintains a bath of paint solvent around the upper end of the pump piston 18 to dissolve any paint which may accumulate thereon and which when dry could seriously damage the packing through which the upper end of the pump piston 18 slides during its pumping travel.

Air pressure for operating the air motor B is supplied by an air pump 20 through a pressure line 21 which is connected to a pressure regulator valve 22 secured to the air motor B. Air is exhausted from the air motor B through a muffler 23 which serves to muffle the noise of the escaping air and which will be described in greater detail below. A pressure gauge 24 is located at the top of the air motor B (FIG. 2).

AIR MOTOR AND OPERATING VALVES

The double acting air motor B best shown in FIG. 3 comprises an air cylinder 30 mounted between an upper cylinder head 31 and a lower cylinder head 32. The heads 31 and 32 are preferably formed of cast aluminum while the air cylinder 30 is of aluminum tube stock which has its interior surface hard anodized to accommodate frictional loads and to minimize wear. Within the cylinder 30 is a piston 33 mounted on a tubular piston rod 34.

Operating air enters the cylinder chamber and is exhausted therefrom in opposite phase through inlet-exhaust passages 35 and 36 located in the upper cylinder head 31 and lower cylinder head 32 respectively. The control of the inlet and exhaust of air from the respective ends of the cylinder chamber is accomplished by upper and lower poppet type operating valves 37 and 38 respectively (FIG. 3).

The valves 37 and 38 are located in an operating valve housing or block 40 bolted at one end of the upper cylinder head 31 and at the other end of the lower cylinder head 32. The block 40 has a central air supply passage 41 extending therethrough, which receives operating air from the pressure regulator valve 22 through an inlet fitting 42.

The valves 37 and 38 are poppet type valves essentially identical to one another and will be described and illustrated using the same numerals for corresponding parts. Each of the valves 37 and 38 is pilot operated, and has a control head 43 and an operating head 44 interconnected by a bolt 45 which serves as a valve stem. The heads 43 and 44 are spaced from one another on the bolt 45 by a perforated spacer sleeve 46 which is radially spaced from the bolt 45 and which extends transversely through the operating air pressure supply passage 41 with operating air being passed around the sleeve 46 or through the perforations in the sleeve 46.

The control head 43 moves or travels between limit positions within a control head chamber 47 defined by a recess in the valve block 40 and by a mating recess in an end block 48 bolted to the valve block 40 with a sealing gasket interposed therebetween.

The operating head 44 travels axially between inlet and exhaust positions in an operating head chamber 49 defined by a recess in the valve block 40 and by a cover plate 50 which has exhaust ports 51 through which air may be exhausted from the cylinder through the valves 37 and 38 to the muffler 23 when the respective valve 37 or 38 is in its exhaust position (See valve 38 in FIG. 3).

The valves control the inlet and exhaust of air to the cylinders through inlet exhaust passages 52 and 53 respectively formed in the valve block 40 and which communicate between the operating head chambers 49 and the inlet-exhaust passages 35 and 36 respectively in the upper cylinder head 31 and lower cylinder head 32.

The position of the operating valve 37 is controlled by a pilot valve 54 which transmits a pressure signal to the chamber 47 of the respective control head 43 through a pilot air passage 55 in the valve block 40 and a mating pilot valve passage 56 in the upper cylinder head 31. In like manner the position of the operating valve 38 is controlled by a pilot relay valve 57 which transmits a pressure signal to the chamber 47 of the respective control head 43 through a pilot relay air passage 58 in the valve block 40 and a mating pilot relay air passage 59 in the upper cylinder head 31.

While the pressures used to transmit pressure signals to the operating valves 37 and 38, and the pressure in the operating air supply passage 41 for operating the piston 33 are essentially the same, the operating force derives from the area differential between the outward face of the control head 43 and its inward face. The effective area against which air pressure acts on the inner face is reduced by the valve stem so that equal fluid pressures on opposite sides of the control head will result in greater force in the direction tending to move the valve to the left as viewed in FIG. 3. Accordingly when pressure is supplied to a control head chamber 47 at the outward side of the respective control head 43, the respective operating head 44 will be moved to a position sealing the respective exhaust port 51 while permitting operating air pressure to be transmitted through the perforations in the spacer sleeve 46, into the operating head chamber 49 and out through the respective inlet-exhaust passage 52 or 53 in the valve block 40.

When the pilot pressure signal to a control head chamber 47 at the outward side of the respective control head 43 is removed however, operating air pressure from the main air supply passage 41 will quickly pop the respective control head 43 and operating head 44 to the right as viewed in FIG. 3 where the operating head 44 will seal the chamber 49 from the main air supply passage 41 while at the same time opening the respective exhaust port 51 so that air may be exhausted to the muffler 23 from the inlet-exhaust passage 52 or 53 respectively through the operating head chamber 49.

Accordingly, the operating heads 44 seat in two sealing positions, one of which is against the cover plate 50 for the valve block 40 to seal the exhaust port 51 and the other of which is against the inner wall of the chamber 49 formed by the valve block 40 to seal the chamber from the main air supply passage 41.

The pilot valve and pilot relay valve pressure signals are transmitted in opposite phase to the valves 37 and 38 respectively so that correspondingly the positions of the operating heads 44 will be in reverse phase with one another and accordingly operating pressure will be supplied to one end of the cylinder chamber while being exhausted from the other end and vice versa during the operation of the air motor B.

According to a particular aspect of the invention a unique muffler 23 is provided for reducing the noise caused by the rapid exhaust of pressurized air from the cylinder chamber through the operating valves 37 and 38. The unique construction of the muffler 23 minimizes the problem of ice formation which is often encountered due to the rapid expansion of moisture laden air as it is exhausted.

The muffler 23 comprises a muffler box 110 bolted to the operating valve block 40. The box 110 has a floor with exhaust ports 111 formed therein that register with the exhaust ports 51 in the cover plate 50, and an open top face which is covered by a cover plate 112 to define within the box a muffler chamber 113. The cover plate 112 is formed of relatively thin flexible material and may have longitudinal reinforcing ribs 114. This construction permits the plate 112 to flex or bend resiliently in a lateral plane.

The cover plate 112 is secured to the box 110 in a manner to permit such resilient flexing by means of three spaced bolts 115 which extend through the cover at spaced locations along a central longitudinal line and which are received in posts 116 extending upwardly from the floor of the muffler box 110. With this arrangement the plate 112 may flex or bend outwardly slightly in response to pressure within the muffler chamber 113.

The sides of the top plate 112 are spaced from the adjacent edges of the side walls of the muffler box 110 to define narrow exhaust spaces 117, approximately 0.015 inch wide through which exhaust air may escape from the muffler chamber 113. While ice may form in the narrow spaces 117 due to the high velocity and rapid expansion of moisture laden air escaping therethrough, such formation will increase the pressure within the chamber which in turn will cause the plate 112 to flex outwardly. This flexing will cause blow-out or purging of the ice from the spaces and thus prevent ice accumulation.

The muffler box 110 is thermally insulated from the valve block 40 by a thermal barrier comprising both an insulating gasket 118 preferably formed of a dielectric material, and an air space 119. Air is free to circulate through the space 119 so that the operating parts of the valves 37 and 38 will be maintained advantageously at a relatively warm temperature and will not be chilled by the muffler box which is cooled by the rapid expansion of the air being exhausted therethrough.

While the invention has been shown and described with reference to a specific embodiment thereof this is for the purpose of illustration rather than limitation and other modifications and variations will be apparent to those skilled in the art upon reading of the specification, all with the intended spirit and scope of the invention. Accordingly the patent is not to be limited to the form specifically illustrated and described nor in any manner that is inconsistent with the extent to which the progress in the art has been advanced by the invention.

What is claimed is:

1. A device for muffling the noise generated by gas being exhausted from a compressible fluid motor, comprising an open sided box defining a chamber for receiving exhaust gases, a flexible closure plate adapted to cover the open side of said box with marginal portions thereof spaced slightly from the top edges of the side walls of said box to define narrow exhaust spaces, said plate being mounted to permit flexing thereof to move said marginal portions outwardly from said box in response to pressure in said chamber.

2. The device of claim 1 including a thermal insulating means interposed between said device and said fluid motor to prevent chilling of adjacent parts of said fluid motor by conduction of heat to said muffler box.

3. A device for muffling the noise generated by gas being exhausted from a compressible-fluid motor comprising a box defining a chamber for receiving exhaust gases, said box having a pair of adjacent walls with their adjacent edges spaced slightly from each other to define a narrow exhaust space, at least one of said walls being flexible and being mounted to permit flexing thereof to move its adjacent edge outwardly from said box in response to pressure in said chamber to thereby widen said exhaust space.

4. The device of claim 3 wherein said flexible wall is a flexible closure plate secured to said box at points defining a line about which the adjacent edge of said plate is flexed.

* * * * *